April 9, 1935. L. G. KASAMIS 1,997,192
GRILLING STOVE
Filed Aug. 26, 1932 2 Sheets-Sheet 1
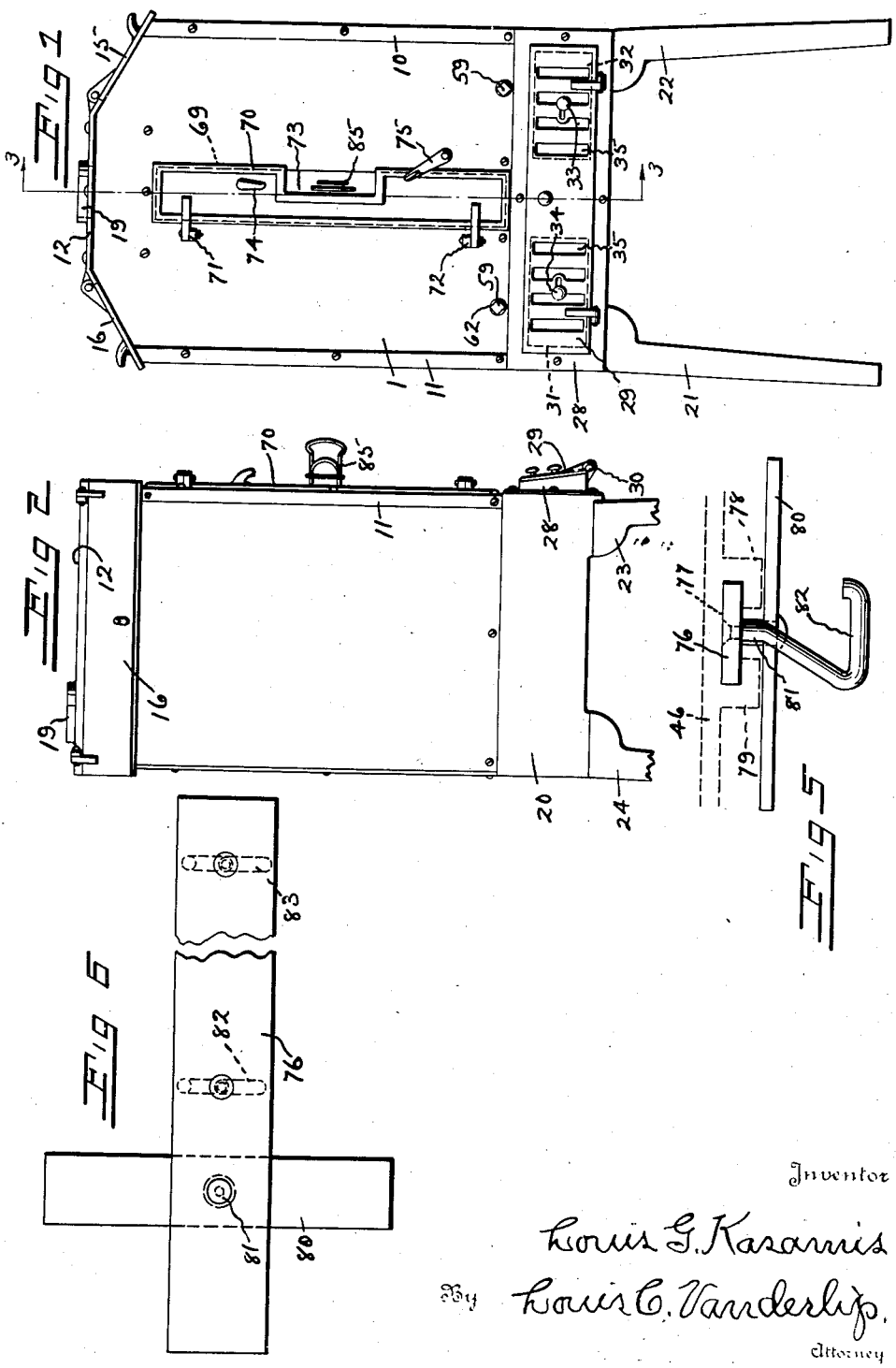
Inventor
Louis G. Kasamis
By Louis C. Vanderlip
Attorney

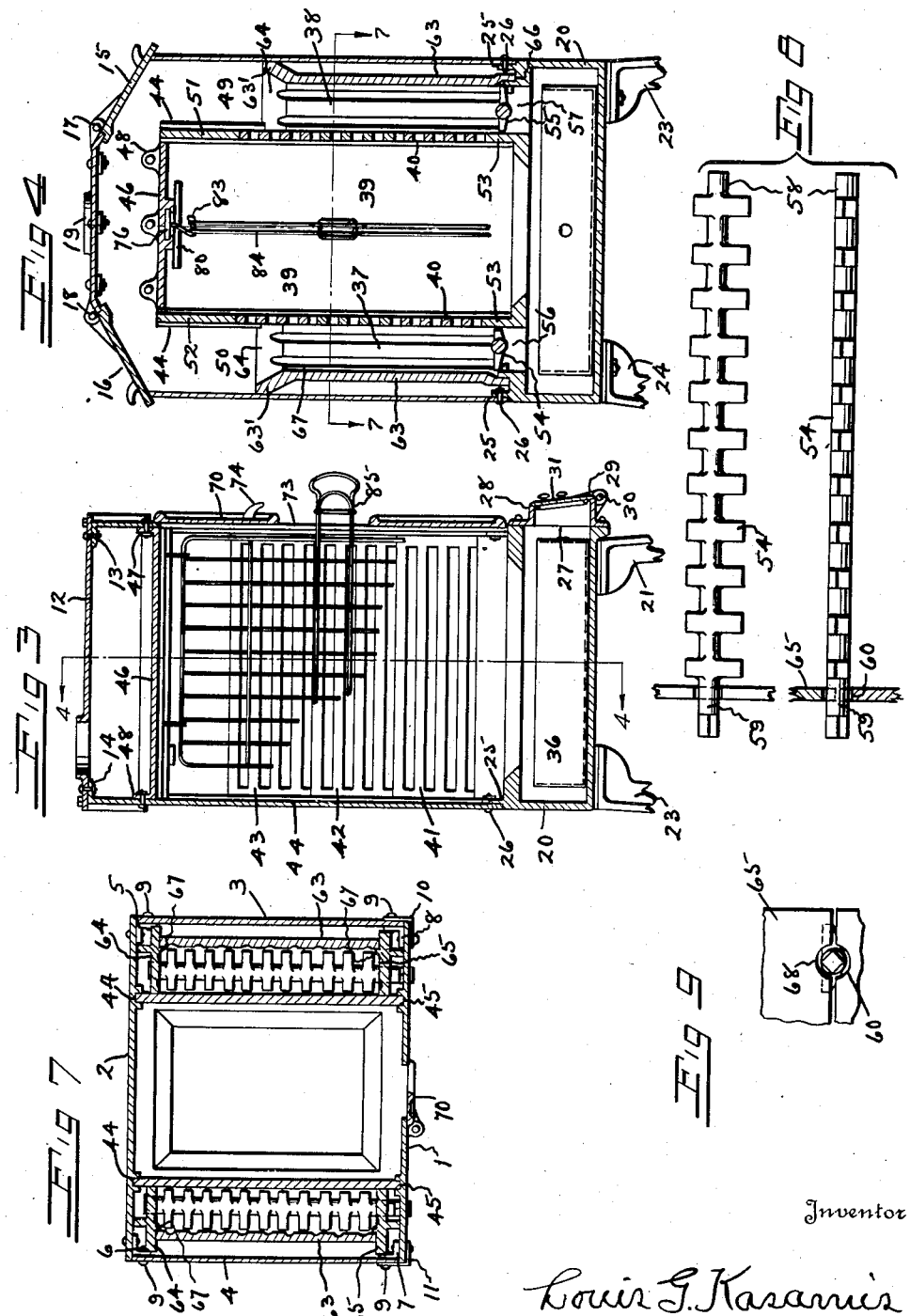

Patented Apr. 9, 1935

1,997,192

UNITED STATES PATENT OFFICE 1,997,192

GRILLING STOVE

Louis G. Kasamis, Elkhart, Ind.

Application August 26, 1932, Serial No. 630,525

9 Claims. (Cl. 126—41)

My invention relates to cooking stoves and particularly to grilling or broiling stoves.

The principal object of my invention is to provide an improved broiling stove for grilling or broiling steaks, chops, or other meats, on both sides simultaneously.

Another object is to provide a stove for grilling meats which has opposed upright fire-boxes which are spaced apart to provide an oven or grilling chamber between the fire-boxes, and a movable suspended meat carrier element arranged in the grilling chamber.

A third object of the invention is to provide a stove for grilling meats which has opposed upright and spaced fire-boxes which are provided with tiltable grates and removable metal liners.

Another object is to provide a meat grilling stove which has opposed, upright, spaced fire-boxes which are equipped with upright removable grates, an ash-pit unit connected with the stove body, and dampers for the ash-pit unit.

Still another object is to provide a meat grilling stove which has opposed, upright, spaced fire-boxes which are equipped with upright removable grates, and improved means for inserting and removing the upright grates.

Another object is to provide a meat grilling stove which has opposed, upright, spaced fire-boxes which are equipped with tiltable grates, and a closed ash-pit unit connected with the stove body.

Yet another object of the invention is to provide a meat grilling stove which has opposed, upright, spaced fire-boxes to provide a grilling chamber or oven therebetween, a slidable meat rack carrier mounted in the grilling chamber or oven and which is movable into and out of the grilling chamber or oven.

Other and more specific objects of the invention are mentioned and described herein.

The invention is illustrated on the accompanying drawings, wherein,

Figure 1 illustrates an exterior front elevational view of the improved broiler stove;

Fig. 2 illustrates a side elevational view thereof with the legs in fragment;

Fig. 3 is a section taken on line 3—3 of Fig. 1;

Fig. 4 is a section taken on line 4—4 of Fig. 3;

Fig. 5 illustrates an enlarged fragmental view of the meat rack carrier and its supporting means, the latter in dotted lines;

Fig. 6 illustrates a top plan view of the meat rack carrier and its stop element;

Fig. 7 illustrates a section taken on line 7—7 of Fig. 4;

Fig. 8 illustrates two views of one of the tiltable fire-box grates; and

Fig. 9 illustrates an end elevational view of the grate shown in Fig. 8 and the cooperation of the fire-box end liners therewith to provide bearings for the journal shafts of said grate.

Similar numerals of reference indicate like parts throughout the several views on the drawings.

Referring now to the details of the drawings Figures 1 and 2 of the drawings illustrate exterior elevational views of a rectangular stove body built in accordance with my invention and in which are incorporated a front wall 1, a rear wall 2, and side walls 3 and 4 which are secured together in rectangular relation by upright corner angle irons 5, 6, 7 and 8, respectively, fastened interiorly of the stove body by rivets or bolts 9, or otherwise in any suitable manner. The corners of the front and side walls may have exterior angle irons 10 and 11 secured thereto by rivets or bolts which may be the same fastener elements which engage the angles 7 and 8.

A stove cover is mounted upon the top of the stove body and it may comprise the top element, of lesser width than the stove body, as indicated by numeral 12 and which may be secured to the front and rear wall brackets 13 and 14, respectively, by rivets or otherwise in any suitable manner. Hinged covers 15 and 16 may be connected with the top element 12 at 17 and 18, respectively. The stove top element 12 may be provided with a flue or pipe connection 19 to conduct the smoke and gases from the stove.

The stove body rests upon and is rigidly connected with a closed box-like ash-pit element 20, and the latter is carried upon four legs 21 to 24 inclusive at the corners thereof. Preferably, the ash-pit unit 20 is cast metal and is provided with upright side flanges 25 to which the lower ends of the front, rear and side walls of the stove are rigidly fastened by rivets or bolts 26, said ash-pit being generally rectangular in formation to accord with the shape of the stove body defined by the front, rear and side walls of the stove.

The ash-pit 20 is provided with a front opening 27 about which is rigidly secured the ash-pit door frame 28, the latter having a door 29 hingedly mounted thereon at 30 which door is provided with suitable damper openings which are under the control of a pair of sliding dampers 31 and 32, the latter having handles 33 and 34 for operating said dampers to regulate the damper openings 35 provided in said door. An ash pan 36 is removably arranged within the pit unit 20 and may be readily removed through the opening 27 when the door 29 is swung open.

My improved grilling or broiling stove includes the spaced, upright, opposed fire-boxes or pots 37 and 38, preferably adapted to burn coal, coke, or other suitable material or fuel, and which are arranged on opposite sides of the broiling chamber or oven 39, each of the fire-boxes having an upright grate unit 40 adjacent the chamber 39. Preferably, each of the grate units 40 is composed of three sections 41, 42 and 43, arranged one upon the other, to facilitate the mounting and removal thereof from the stove interior, and said sections are readily removable and may be readily replaced, as worn or damaged, as will be hereinafter described. The sections 41, 42 and 43 of each grate unit 40 are held in an upright position by the channelled upright guide-ways 44 and 45 formed, respectively, in the rear and front walls 2 and 1 of the stove body, said guide-ways being preferably cast integral with said rear and front wall sections to facilitate the manufacture thereof, and preferably they extend to a point adjacent the upper ends of the stove walls 1 and 2, where they are readily accessible through the top openings normally closed by the top covers 15 and 16.

The numeral 46 indicates the top wall of the broiling oven or chamber 39 which is disposed transversely of and within the stove body substantially above the fire-boxes 37 and 38, said top wall element being provided with end flanges 47 and 48 riveted to the front and rear walls 1 and 2, respectively, the lateral edges of said oven top wall terminating within and short of the upper end of the guideways 44 and 45 to provide the smoke and gas passages 49 and 50 for placing the fire-boxes in communication with the flue connection 19. The two opposed upright plates 51 and 52 are removably arranged in the guideways 44 and 45 to compose the upper side walls of the oven 39, each of said plates resting upon the upper edge of the top section 43 of the grate unit 40. The lower section 41 of each of the grate units 40 rests upon a ledge 53 which is preferably cast integral with the ash-pit unit 20, said ledge registering with the guideways in which said grate sections 41 are arranged and supported.

The numerals 54 and 55 indicate tiltable grates mounted horizontally adjacent the lower end of the fire-boxes 37 and 38 and within the ash discharge openings 56 and 57, respectively, the latter being in communication with the ash-pit in which the pan 36 is carried. Each of the rocking grates, which are similar in construction, has a cylindrical bearing shaft at each end thereof, as indicated by the numerals 58 and 59, which shafts are removably arranged in semi-circular bearing recesses 60 and 61, respectively, (one only being illustrated) to enable ready rocking movement of the grate. Fig. 8. Each grate shaft 59 is extended outward through an opening 62 formed in the front wall 1 of the stove, said shaft end being squared to enable tool application thereto for rocking said grate. Any suitable stop means may be incorporated in this grate structure and its bearings to retain the grates 54 and 55 in a substantially horizontal position, whereby they are tiltable in one direction only, such means being well known in the art and which may comprise a stop lug suitably located.

The grates 54 and 55 are readily assembled within the fire-boxes through the top openings 75 which are normally closed by the hinged covers 15 and 16, and the worn out grates may be readily removed through the same openings. Each firebox carries three removable metal liners, viz: side liner 63, and the two end liners 64 and 65, substantially spaced from the stove side walls and all separately introducible through the top openings of the stove which enable the assembly of the grates 54 and 55 within the stove. The lower end of each side liner 63 is arranged in a channel-like recess 66 of which the flange 25 may form the outer wall, the upper end of said side liner being maintained in juxtaposition, with the outwardly projecting portion 63' in contact with the side walls of the stove, by a lug 67 which is integral with each end liner, which lug abuts the inner surface of said side liner after the side liners have been mounted in position adjacent the ends of the side liner.

Each of the end liners 64 and 65 for the fireboxes extends downward substantially to the firebox bottom and the lower end of each of said liners is provided with a semi-circular bearing recess 68 which engages about and above the grate shafts 58 and 59 to maintain the juxtaposition of the latter. Figures 8 and 9 illustrate one such bearing structure for the grate shafts 58 and 59, it being understood that the general structure is the same for both of said shafts.

The stove front wall 1 is provided with an upright relatively narrow opening 69 which is normally closed by a door 70, the latter being hinged to the wall 1 at 71 and 72, said door being provided with an opening 73 and a handle 74, said opening 73 remaining open permanently.

A swinging latch 75 hinged to the front wall 1 may be incorporated to hold the door 70 in the closed position. The opening 69 may extend upwardly to the plane of the oven top 46 where it registers with the outer end of a meat rack carrier bar 76 which is slidably mounted in a horizontal guideway 77 formed on the lower face of the top 46 by the cooperating spaced L shaped ledges 78 and 79 which are preferably cast integral with the oven top 46. The guideway 77 extends at substantially right angles to the front wall 1 and is substantially coextensive with the length of the oven top 46 the outer end thereof being open to enable the assembly of the bar 76 therein.

The carrier bar 76 has a transverse stop bar 80 secured thereto on the under side thereof by a fastener stud or pin 81, which stud effects a spaced relation between the stop bar 80 and the main bar 76 to enable the former to be arranged below the ledges 78 and 79, and whereby the stud 81 is movably arranged between said ledges. A pair of meat rack supporting hooks 82 and 83 may be connected with the bar 76 to depend therefrom, the shank of each of said hooks being movable within the slot or interstice between the ledges 78 and 79.

The numeral 84 indicates a wire meat rack unit adapted to have the steaks or chops clamped therein and which is adapted to be removably suspended on the hooks 82 and 83 for supporting said meat rack and contents in an upright position in the chamber or oven 39 substantially midway between the fire pots 37 and 38. The rack 84 may be of any suitable form, but, as illustrated, it is the well known two part device hinged together at the outer end provided with a long handle 85 at the opposite end, with a clamping ring for clamping the two parts together adjacent the handle.

When the rack 84 is arranged wholly within the chamber or oven 39 and suspended from the hooks 82 and 83, as described, the rack handle 85 projects through the opening 73 of the door 70 where it is readily accessible from the stove exterior and free from excessive heat.

In operation of my improved broiler, the steaks or chops are placed within the rack 84 and the latter is then suspended from the hooks 82 and 83 on the carrier bar 76, the latter of which may be first drawn outward through the opening 69 to advantageously locate said hooks. In this operation of the bar 76 the stop bar 80 will engage the wall 1 and limit the outward movement of said bar, the inward movement of said bar being limited by its end engagement with the rear wall 2. When the meat is properly cooked the operator opens the door 70, grasps the rack handle 85 and pulls the rack 84 outward through the door opening 69, in which position of the elements the rack is or may be removed from the hooks 82 and 83 and the cooked meat taken from the rack.

I claim:

1. In a grilling stove, the combination of a stove body said stove body being provided with front and rear walls, a pair of opposed, spaced fire-boxes within the stove and providing a grilling chamber therebetween, said fire-boxes including an upright grate unit for each box, and guide-ways provided in said stove front and rear walls for supporting said grate units in an upright position.

2. In a grilling stove, the combination of a stove body having cast metal front and rear walls, a pair of opposed, spaced fire-boxes within the stove and providing a grilling chamber therebetween, each of said fire-boxes including an upright grate unit, guide means cast in said stove front and rear walls for maintaining said grate units in an upright position and enabling removability thereof.

3. In a grilling stove, the combination of a stove body provided with cast metal front and rear walls, a pair of opposed, spaced fire-boxes within the stove and providing a grilling chamber therebetween, each of said fire-boxes including an upright grate unit, upright guide means integral with the stove walls for maintaining said grate units in an upright position, and individual grates for the fire-box bottoms.

4. In a grilling coal stove, the combination of a stove body, a separate element ash-pit unit arranged below the stove body and provided with grate supporting ledges a pair of opposed, spaced, upright fire-boxes within the stove and providing a grilling chamber therebetween, each of said fire-boxes including an upright removable grate unit said grate units being mounted upon said ash-pit unit ledges, and tiltable grate means for each of the fire-boxes.

5. In a grilling stove, the combination of a stove body, a pair of opposed, spaced, fire-boxes within the stove and providing a grilling chamber therebetween, an upright multi-part removable metal lining for each fire-box arranged at one side and both ends thereof and spaced from the stove walls, a tiltable grate for each fire-box, a separate element ash-pit unit below said grates, and means for securing said ash-pit unit to said stove body.

6. In a grilling stove, the combination of a stove body provided with front and rear walls, each of said walls being provided with a pair of upright grate guide grooves, a separate element ash-pit unit arranged below the stove body and secured thereto, said ash-pit unit being provided with a pair of grate supporting ledges which register with said grate guide grooves, a pair of opposed, spaced fire-boxes within the stove and providing a grilling chamber therebetween, said fire-boxes including a pair of opposed upright grate units arranged in said grate guide grooves and supported upon said ash-pit unit ledges, a carrier element movably mounted in said grilling chamber, and means on said carrier element for supporting meat.

7. In a grilling coal stove, the combination of a stove body provided with upright front and rear walls, each of said walls being provided with a pair of upright grate guide grooves, a pair of opposed spaced fire-boxes within the stove and including a pair of upright grate units removably mounted in said grate guide grooves, a horizontal partition rigidly connecting said stove front and rear walls adjacent the top ends of said grate guide grooves and between said grooves, said partition being provided with a pair of integral parallel L shaped guide elements, in spaced relation and extending longitudinally of said partition, a meat carrier plate slidably arranged in said L shaped guide elements, and means for suspending meat from said carrier plate.

8. In a grilling coal stove, the combination of a stove body provided with upright front and rear walls, each of said walls being made of cast metal and each being provided with a pair of spaced upright grate grooves cast therein, a removable cover for said stove body, spaced upright fire-boxes within the stove and providing a grilling chamber therebetween, each of said fire-boxes including an upright grate unit removably arranged in said grate grooves and removable through the top of the stove, a separate element ash-pit unit secured to the stove bottom and provided with an ash intake opening for each of said fire-boxes, and a rocking grate in each of said ash intake openings.

9. In a grilling coal stove, the combination of a stove body provided with upright front and rear walls, each of said walls being made of cast metal and each wall being provided with a pair of spaced upright grate grooves cast therein, a removable cover for said stove body, spaced upright fire-boxes within the stove and providing a grilling chamber therebetween, each of said fire-boxes including an upright grate unit removably arranged in said grate grooves and removable through the top of the stove, a top wall for the grilling chamber, movable means on said grilling chamber top wall for suspending meat within said chamber, a separate element ash-pit unit disposed below the stove body and attached thereto, said ash-pit unit being provided with an ash intake opening for each of said fire-boxes, a rocking grate mounted in each of said ash intake openings, and metal wear liners mounted in each fire-box and removable through the top of the stove.

LOUIS G. KASAMIS.